Sept. 6, 1955     A. H. WULFSBERG     2,716,897

DIFFERENTIAL MECHANISM

Filed Nov. 5, 1953

INVENTOR.
ARTHUR H. WULFSBERG
BY
ATTORNEY

United States Patent Office 2,716,897
Patented Sept. 6, 1955

2,716,897

DIFFERENTIAL MECHANISM

Arthur H. Wulfsberg, Cedar Rapids, Iowa, assignor to Collins Radio Company, Cedar Rapids, Iowa, a corporation of Iowa Application November 5, 1953, Serial No. 390,351

4 Claims. (Cl. 74—10.54)

This invention relates in general to differentials and in particular to a mechanical differential wherein the positions of a pair of input shafts may be added to position a third shaft.

It is oftentimes desirable to add two shaft positions so as to obtain their sum. For example, in the electronic art, a radio receiver might have coarse and fine adjustment shafts which it is desired to couple to a single tuning element. The input shaft positions must be added and supplied to the controlled unit.

The present invention relates to apparatus for adding the positions of two shafts so as to control a third shaft.

It is an object of this invention therefore to provide a differential which will add the position of two input shafts.

Another object of this invention is to provide an improved differential.

A feature of this invention is found in the provision for a pair of input shafts rotatably supported adjacent each other and with an output shaft mounted in axial alignment with one of said input shafts and means for adding the positions of the input shafts to the output shaft.

Further features, objects and advantages of this invention will become apparent from the following description and claims when read in view of the drawings, in which:

Figure 1:
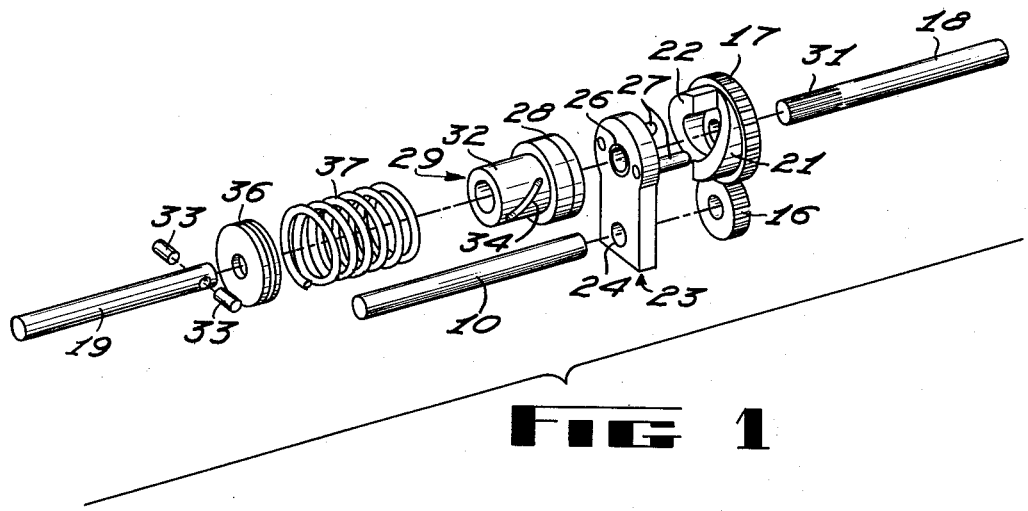
Figure 1 is an exploded view of the apparatus of this invention.
Figure 2:
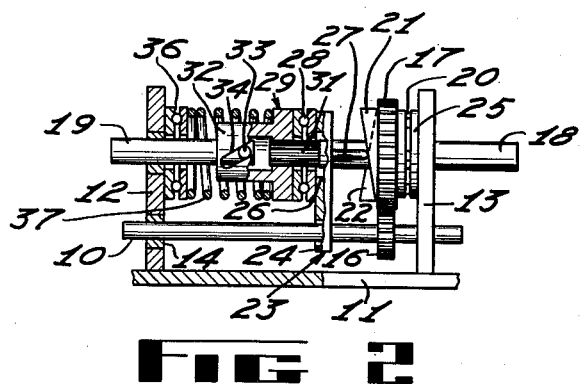
Figure 2 is a partial sectional view of the apparatus of this invention.

With reference to Figure 2 a first input shaft 10 is rotatably supported by means including a base plate 11 that has stand-offs 12 and 13 supported thereon, in which are mounted bearings 14 that support the shaft 10.

A spur gear 16 is rigidly attached to the shaft 10 and meshes with a gear 17 rotatably supported by an output shaft 18. Thrust bearings 20 are mounted between the gear 17 and a bearing plate 25 attached to the stand-off 13.

A second input shaft 19 is rotatably supported by the stand-off 12 in axial alignment with shaft 18. Attached to one face of the gear 17 are a pair of cam surfaces 21 and 22 which are shaped so as to provide linear motion with rotation.

A cam follower member 23 is formed with a pair of holes 24 and 26 through which shafts 10 and 18 rotatably extend. A pair of cam followers 27 are attached to the member 23 and engage the cam surfaces 21 and 22.

Thrust bearings 28 are mounted between the member 23 and a collar 29 that is attached to the shaft 18. The collar 29 is non-rotatably attached to the shaft 18 by means of the splines 31 but is free to move longitudinally relative to shaft 18. The collar 29 has a smaller portion 32 which is hollow and which receives the end of the shaft 19 therein. A pair of transverse pins 33 are mounted in the end of shaft 19 and extend through slots 34 formed in the portion 32. The slots 34 are cut at about a 45 degree angle with shaft 19. A thrust bearing 36 is attached to the stand-off 12 and a spring 37 extends from thrust bearing 36 to the collar 29.

In operation, the shaft 19 is the coarse adjustment shaft and the shaft 10 is the fine adjustment shaft. The shaft 19 drives shaft 18 directly through pins 33, collar 29 and the splined portion 31. Thus, when shaft 10 is held stationary, shaft 18 will turn the same amount as shaft 19. However, as shaft 10 is rotated it moves gear 17 which is rotatably supported on the shaft 18 and this varies the position of the cam follower 27 relative to the cam surfaces 21 and 22. This causes collar 29 to move longitudinally. The action of slots 34 on pins 33 causes collar 29 to be rotated. This rotation is transmitted to shaft 18 by virtue of the splined portion 31. Thus, shaft 10 is capable of making fine adjustments of the position of shaft 18.

This structure provides means for adding the positions of two shafts so that their sum will control an ouput shaft in a differential fashion. One of the shafts may be the coarse adjustment so as to make relatively large changes in position of the output shaft and the other shaft may be the fine adjustment which makes relatively small changes and corrections in position at the output shaft.

Although this invention has been described with respect to a particular embodiment thereof, it is not to be so limited as changes and modifications may be made therein which are within the full intended scope of the invention as defined by the appended claims.

I claim:

1. A differential mechanism comprising a base plate, a pair of standoffs extending upwardly from said base plate, a first input shaft rotatably supported by the standoffs, a first gear attached to said first input shaft, an ouput shaft rotatably supported by the second standoff, a second gear rotatably supported on said output shaft, a pair of cam surfaces mounted on the face of said second gear, said second gear in mesh with the first gear, a cam-follower member formed with a pair of openings through which the first input and output shafts extend, a pair of cam followers attached to said cam-follower member and in engagement with said cam surfaces, a collar slidably but non-rotatably attached to said output shaft adjacent said cam-follower member and formed with a hollow portion and a pair of transverse slots cut at an angle relative to the longitudinal axis of said output shaft, a second input shaft supported by the first standoff and in axial alignment with the output shaft, a pair of transverse pins attached to the end of the second input shaft and said pins received in the slots formed in said collar, and a spring mounted between the first standoff and said collar and maintained under compression.

2. A differential shaft mechanism for adding the positions of a pair of shafts comprising, a base member with a pair of upwardly extending standoffs, a first shaft rotatably supported by the pair of standoffs, a second shaft rotatably supported by the first standoff and terminating between the first and second standoffs, a third shaft rotatably supported by the second standoff and mounted in axial alignment with the second shaft and terminating between the first and second standoffs, a pair of transverse pins attached to the end of said second shaft, a collar slidably but non-rotatably attached to the end of said third shaft and formed with a hollow portion in which the end of the second shaft is received, a pair of transverse sloping slots formed in said collar and the transverse pins received therethrough, a cam-follower member formed with a pair of openings which are receivable over the first and third shafts adjacent said collar, a pair of gears mounted respectively on first and third shafts and in mesh, a pair of cam surfaces formed on the face of the gear mounted on the third shaft on the side toward the cam-follower member, cam follower projections extending from the cam-follower member to the cam surfaces, and a spring mounted between said collar and the first standoff to bias them apart.

3. A shaft differential mechanism comprising, a base plate with a pair of standoffs mounted thereon, a first shaft rotatably supported by the first and second standoffs, a second shaft rotatably supported by the first standoff and terminated between the first and second standoff, a third shaft rotatably supported by the second standoff and terminating between the first and second standoffs, said second and third shafts mounted in axial alignment, a collar slidably but non-rotatably attached to the end of said third shaft and formed with a hollow portion into which the end of the second shaft extends, a transverse slot formed in said collar at a substantially forty-five degree angle relative to the axis of the second and third shafts, a transverse pin attached to the end of said second shaft and received through said transverse slot, a spring mounted between said first standoff and said collar to bias them apart, a first gear attached to the first shaft, a second gear attached to the third shaft, a cam surface attached to one face of the second gear, a cam-follower member formed with a pair of openings through which the first and third shafts rotatably extend and mounted between the collar and the cam surface, and a cam-follower projection attached to the cam-follower and in engagement with the cam surfaces.

4. A differential shaft mechanism comprising, a base plate with a pair of standoffs mounted thereon, a first shaft rotatably supported by the pair of standoffs, a second shaft rotatably supported by the first standoff and terminating between the first and second standoffs, a third shaft mounted in axial alignment with the second shaft and rotatably supported by the second standoff, a collar slidably but non-rotatably attached to said third shaft, said collar formed with a hollow portion within which the end of the second shaft is received, a pair of angularly disposed slots formed in said collar, a pair of transverse pins attached to the end of the second shaft and received within said slots, a spring mounted between said first standoff and said collar, a first gear attached to the first shaft, a second gear rotatably supported on the third shaft adjacent the second standoff, a pair of cam surfaces of generally linear design attached to the face of said second gear opposite the second standoff, a cam-follower member formed with a pair of openings through which the first and third shafts rotatably extend and mounted between the collar and said cam surfaces, and a pair of cam-follower projections attached to said cam-follower member and in engagement with said cam surfaces.

References Cited in the file of this patent

UNITED STATES PATENTS 2,448,292    Barber ---------------- Aug. 31, 1948

FOREIGN PATENTS 47,716    Netherlands ------------ Apr. 15, 1939